United States Patent [19]

Schulze

[11] Patent Number: 4,661,873

[45] Date of Patent: Apr. 28, 1987

[54] HEAD LIFTER MECHANISM FOR HARD DISK DRIVE

[75] Inventor: Dieter M. Schulze, Saratoga, Calif.

[73] Assignee: Lapine Technology, Milpitas, Calif.

[21] Appl. No.: 671,232

[22] Filed: Nov. 14, 1984

[51] Int. Cl.⁴ .................... G11B 21/12; G11B 21/02
[52] U.S. Cl. .................................... 360/105; 360/75
[58] Field of Search ............... 360/105, 106, 75, 128

[56] References Cited

U.S. PATENT DOCUMENTS

| | | | |
|---|---|---|---|
| 3,702,997 | 11/1972 | Jamieson | 340/174.1 |
| 3,882,541 | 5/1975 | Ghose et al. | 360/78 |
| 4,005,485 | 1/1977 | Opocensky | 360/75 |
| 4,028,735 | 6/1977 | Miyazaki | 360/106 |
| 4,058,844 | 11/1977 | Dirks | 360/106 |
| 4,300,176 | 11/1981 | Gilovich et al. | 360/105 |
| 4,307,426 | 12/1981 | Aldenhoven | 360/109 |
| 4,375,070 | 2/1983 | Isozaki et al. | 360/75 |
| 4,392,165 | 7/1983 | Wright | 360/105 |
| 4,423,446 | 12/1983 | Takahashi et al. | 360/106 |
| 4,462,054 | 7/1984 | Dong et al. | 360/105 X |
| 4,476,404 | 10/1984 | Bygdnes | 360/105 |
| 4,490,635 | 12/1984 | Harrison et al. | 310/38 |
| 4,504,879 | 3/1985 | Toldi et al. | 360/105 |
| 4,530,022 | 7/1985 | Savanella | 360/97 |

FOREIGN PATENT DOCUMENTS 57-36585 9/1983 Japan .

Primary Examiner—Stuart N. Hecker
Assistant Examiner—Alyssa H. Bowler
Attorney, Agent, or Firm—Knobbe, Martens, Olson & Bear

[57] ABSTRACT

A head lifter for a disk drive is electromagnetically actuated in order to securely remove the head/flexure assembly from the surface of the disk in order to avoid damage. The lifter operates in a fashion similar to a pair of scissors such that the motion of the armature in the electromagnetic loop produces motion in the opposite direction by the lifting arms thus accomplishing the lifting function. The lifting arms are specially shaped so as to securely retain the flexures away from the disk surface regardless of the relative location of the lifting arms with respect to the flexure. The lifting mechanism is provided with a magnetic shield which preserves the reliability of the data recorded on the disk. The lifting is accomplished by a spring which insures safe lifting in a power off condition. During normal operation of the disk drive, the electromagnetic loop draws a very low current in order to reduce the power requirements and further provide magnetic shielding. A unique dampener is also provided to control the rapid acceleration of the lifting arms during the picking movement of the armatures.

12 Claims, 8 Drawing Figures

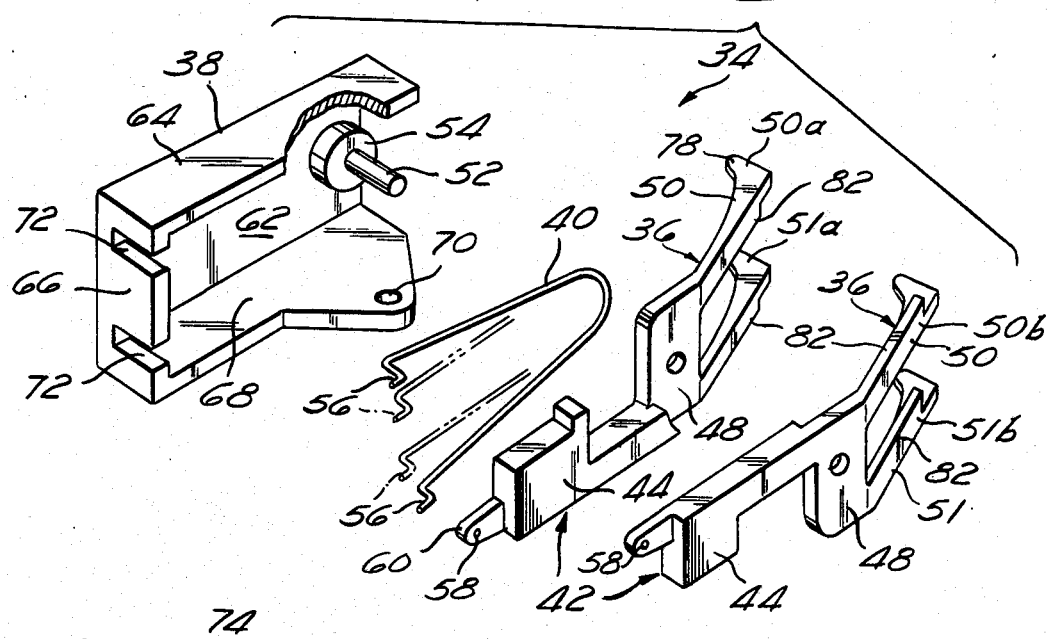
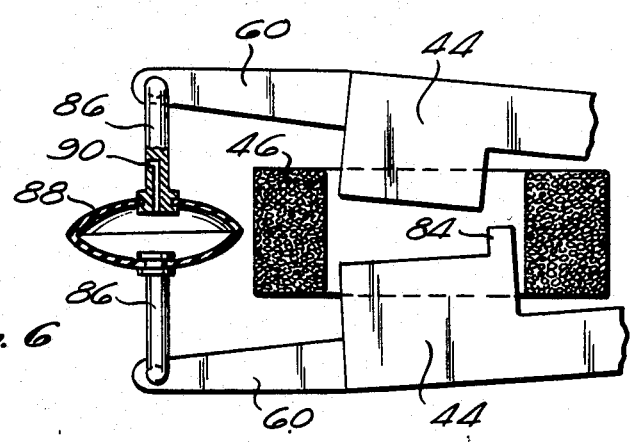

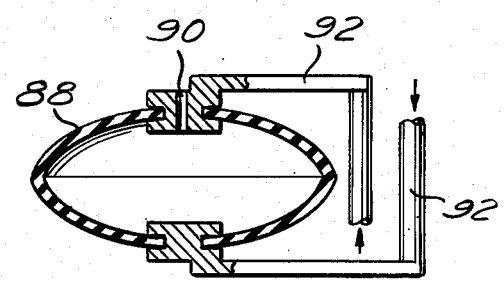
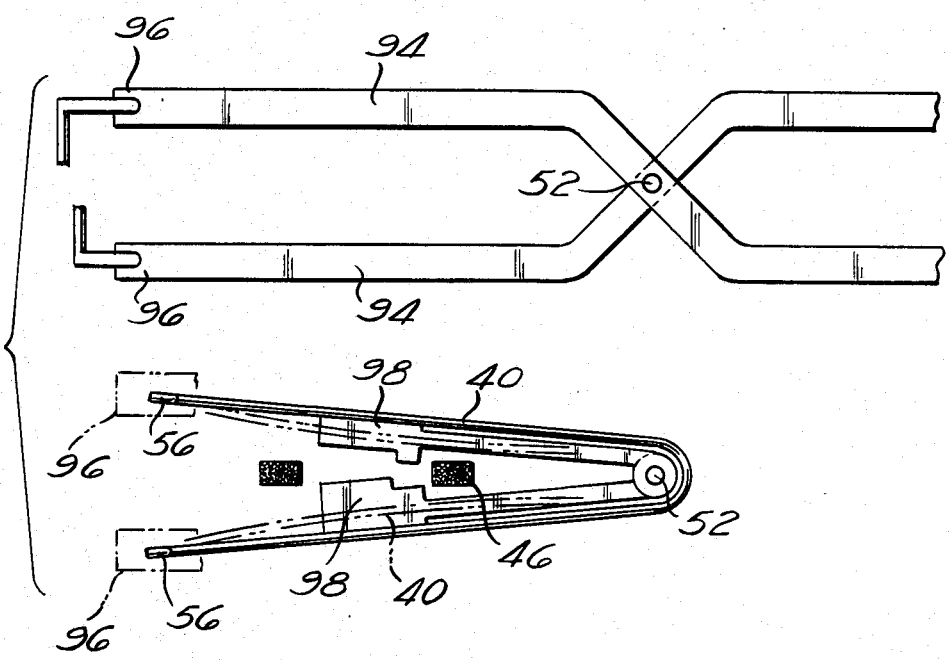

HEAD LIFTER MECHANISM FOR HARD DISK DRIVE

BACKGROUND OF THE INVENTION

The present invention relates to a mechanism for protecting the hard disk assembly of a Winchester type hard disk drive, and, in particular, to a mechanism for lifting the read/write head off of the disk media during a power off condition to protect the head and the media from damage and possible loss of data.

A highly preferred mass data storage device for digital computers is a hard disk drive, and particularly a Winchester type hard disk drive. In this well known technology, data is magnetically recorded onto and read from both sides of a relatively inflexible disk which rotates at a very high speed. The disk generally is comprised of a substrate, such as aluminum, which has been coated with a magnetic sensitive substance such as gamma ferric oxide. Alternatively, the substrate may be plated or splattered by metallic particles, such as cobalt-/nickle. As the disk rotates, digital information is recorded onto or read from each of the two planar surfaces of the disk by a pair of small heads, each of which is supported above the surface of the disk by the slipstream of air created by the high rate of rotation of the disk. Therefore, the head "files" on this air bearing just barely above the surface of the disk, for example in the range of 6–20 microinches. Hard disk drives of the Winchester type are preferred over the flexible data storage media, such as floppy disk drives, because of the high data density, reliability and convenience.

The improved density of a hard disk drive is accomplished because of the very low flying height of the head. Although the low flying height increases the risk of "crash", i.e., the unintended contact between the head and the disk media, this risk is reduced because of the sealed environment of the disk drive. That is, the disk drive is impervious to dust or dirt which could cause the head to crash on the disk media. There is no manual handling or operation of the disk drive, further insuring its reliability. Winchester type hard disk drives are fully self-contained and automatically actuated. Thus, in addition to their reliability, they also generally have much longer life than floppy type disk drives which are frequently handled by the user. In addition, the convenience of the hard disk drive is highly advantageous because it can be manufactured as an integral part of the main computer, being incorporated into the CPU frame.

Over the past few years, there has been a rapid trend toward the miniaturization of computers, and in particular personal computers. This trend has led to computers which are small enough to be readily transported by their owners from home to office, etc. Although the portability of such computers increases their utility to the personal computer owner, it also increases the likelihood of damage to the sensitive computer components, and in particular the hard disk drive contained therein.

As the size of computers has decreased, there has also been an increasing demand to reduce the size of the Winchester type hard disk drive. At the same time, there is a need to construct such disk drives so as to be resistant to shock and vibration when not in operation. If the head of the hard disk assembly is permitted to contact or "slap" the surface of the disk, damage to the head and disk media can easily result, with a consequent loss of the data stored on the hard disk. Such slapping can easily result from the shock or vibration which the computer experiences. Furthermore, slapping can cause the magnetic coating of the hard disk drive to chip off, thus increasing the risk of a head crash in future operation.

In order to combat the potential for damage due to shock and vibration, hard disk drive manufacturers have devised shock isolator mountings for the head disk assembly. Lapine Technology, assignee of the present application is the owner of copending application Ser. No. 628,186, filed July 6, 1984, directed to an improved shock mounting, which is incorporated herein by reference.

Other disk drive manufacturers have provided dedicated head landing and take-off zones on the hard disk to avoid the loss of data from head slap. However, such landing zones do not obviate the possibility of damage to the head, nor do they reduce the risk of head crash caused by flaked off bits of the disk coating caused by a previous slap. Furthermore, when the head is permitted to land on the media, it can become stuck there the next time the computer is in use and cause damage to the head. Thus, both the landing and take-off must be very controlled in order to avoid damage to the head. Preferably, the takeoff is very rapid so that the frictional contact between the head and the disk will not cause damage to either one.

In addition, the loading of the head on the disk must also be accomplished in a very controlled fashion. Loading generally refers to the positioning of the head in its flying position above the disk for accomplishing its read/write functions. Loading can either be static or dynamic, referring to the lack of rotation or rotation, respectively, of the disk when loading occurs. For static loading, the head must be loaded very slowly so that a sufficient air bearing is built up under the head in order to permit it to fly above the disk.

Thus, there remains a great need and demand for a mechanism that can keep the head from contact with the disk during a power off situation. Lapine Technology has developed one form of such a head lifter device which is the subject of application Ser. No. 628,689, filed July 6, 1984, which application is hereby incorporated by reference.

SUMMARY OF THE INVENTION

The present invention fulfills the need for a reliable head lifter device by providing an electromagnetically actuated mechanism for simultaneously and safely lifting a pair of read/write heads away from their associated hard disk. The lifter operates in a fashion similar to one pair or more of scissors and can be modified for a dual or multi-disk configuration. The arms of the lifter contact the flexure of each head and lift and lower it in a controlled manner. The present invention is very reliable because of its few moving parts and its automatic, electromagnetic operation.

While the main computer power is on, the head lifter of the present invention remains clear of the flexure for normal head operation. In a power off condition, whether intentional or accidental, the head lifter automatically, but in a controlled fashion, lifts the flexure/-head assembly from the surface ot the disk and maintains it in a lifted position, in order to prevent head slap or other damage to the head or media.

The head lifter of the present invention utilizes a novel scissors-like configuration in order to simultaneously contact and lift a pair of flexures associated with a rotating hard disk. Each blade of the scissors is comprised of an arm, which actually contacts the flexure, and an armature portion at the opposite end of the blade which is electromagnetically driven. The blades of the scissors are rotated about a common axis which serves as a fulcrum for the lever-like blades. Thus, electromagnetic motion produces a moment acting about the axis for increased lifting strength and reliability, and decreased power requirements.

While the power to the CPU is on, the electromagnet causes the two armature members located within the coil to attract one another, thus causing the two arm members to also attract one another. This permits the flexures on both sides of the disk to freely move as the head is reading or writing information on the disk. Immediately upon power off, whether intentional or inintentional, the armature members are torced into their separated positions by means of a spring with a flat force deflection constant, which simultaneously causes the arms to separate, safely lifting the flexures and heads away from the disk surfaces.

The head lifter of the present invention can also be constructed so as to simultaneously lift four separate flexures when the disk drive comprises dual disks. Only a single electromagnet is necessary in this configuration, thus reducing the cost of manufacturing and enhancing reliability.

The head lifter securely lifts the flexure regardless of the radial position of the head. This is an important feature because of the spring force applied by the flexure to the head, which causes the head to be forced in the direction of the surface of the disk. In operation, the head is carefully balanced between the downward spring force applied to it by the flexure and the counteracting, supporting force provided by the slip stream of air or "air bearing" generated by the rapidly rotating disk. In a power off condition, the air bearing is eliminated. Therefore, the spring force of the flexure must be overcome by the head lifter mechanism in order to prevent damage to the head.

However, the magnitude of this spring force varies depending upon the location along the length of the flexure. For example, at the head or distal end of the flexure, the spring force is only about 10-20 grams. However, at the proximal end, where the flexure is cantilevered to the actuator arm, the spring force may be many times this amount.

The present head lifter accommodates this varying spring force by providing specially shaped arms on the scissor blades which counteract the rigidity of the flexure. The shape of the arms takes into consideration the motion of the head/flexure assembly as it moves in an essentially, but not quite, radial direction.

In order to avoid damage to the head or media, the lifting action of the present invention is carefully controlled by slightly dampening the motion of the armatures. This slow, controlled lifting motion is particularly important where the heads are permitted to take off and land on the disk media, or where static loading is desired. The controlled motion is provided by an air dampener, which acts as a bellows attached to the two armature portions of the blades of the scissors. Each armature is also provided with a stop position in order to permit only a predetermined displacement in a given direction. One stop position permits the arm of the scissors blade to lift the flexure and head assembly clearly away from the surface of the disk, in the range of 0.020–0.040 inches, while avoiding contact with the cover plate of the disk drive. The opposite stop position of the armature permits the flexure to move freely in its normal operation.

The electromagnetic configuration of the present invention insures reliable operation for both the head lifter and the disk drive. The armature members are shaped so as to reduce their air gap, thereby facilitating the "picking" motion, or the actuation of the electromagnet, while at the same time reducing the current required. This is an important advantage of the present invention because personal computers are often operated from a battery source which has limited life. Therefore, it is important to minimize the current used by the computer. In addition, the electromagnet generates a closed, well defined flux loop to provide efficient operation of the electromagnet and to reduce the holding current required. Moreover, effective magnetic shielding is provided in order to avoid alteration or loss of the magnetically recorded data on the disk. This shielding is provided by a housing member which is separated by an air gap from the electromagnet. The data is further protected by the well defined flux loop and by the operation of the electromagnet far below the saturation level.

The present invention also eliminates the need for a head load fixture during the assembly of the disk drive. In addition, the invention is modular, e.g., if a head lifter is not desired, it can be omitted without varying the construction of the disk. In other words, the head lifter does not require alteration in the configuration or placement of the other components of the disk drive.

These and other advantages of the present invention are apparent from the drawings outlined below.

BRIEF DESCRIPTION OF THE DRAWINGS

FIG. 3 is an exploded perspective view of the head lifter mechanism of the present invention.

FIG. 4 is a perspective view of the present head lifter positioned adjacent a head/flexure assembly.

FIG. 5 is a side view of FIG. 4.

FIG. 6 is a schematic illustration of the armature members situated within the coil of the electromagnet, and illustrating the dampener which provides controlled motion for the head lifter.

FIG. 7 is a schematic illustration of a reverse dampener.

FIG. 8 is a schematic illustration of an alternate embodiment of the present lifter utilizing the flexibility of the spring to further dampen the acceleration of the lifting arms.

DETAILED DESCRIPTION OF THE INVENTION

Figure 1:
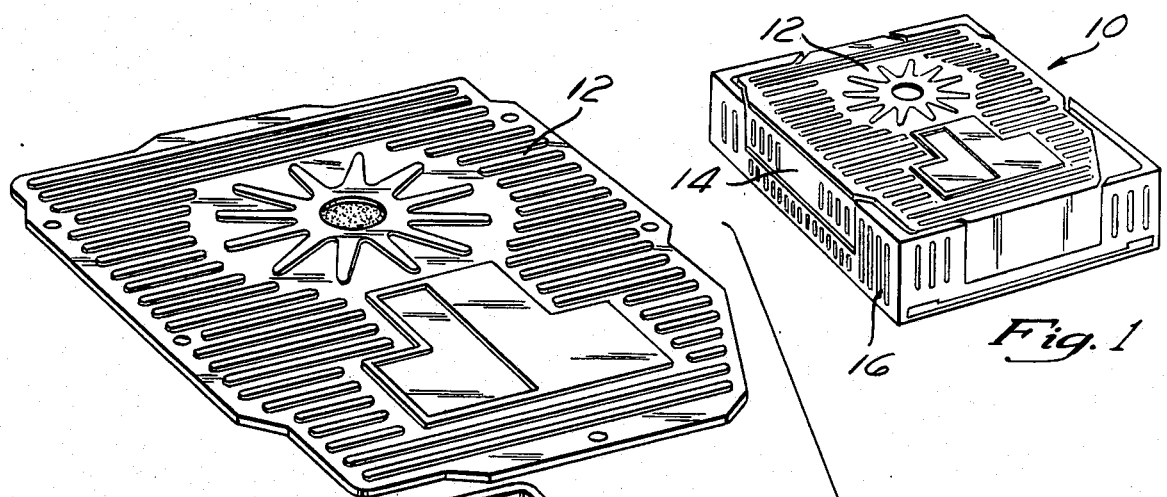
FIG. 1 is an an overall perspective view of a Winchester type hard disk drive.

FIG. 1 illustrates a Winchester hard disk drive 10 incorporating the head lifter mechanism of the present invention. In FIG. 1, the cover plate 12 of the hard disk drive 10 is shown attached to an inner housing or chassis 14 which seals the disk drive against the invasion of dust or dirt which may effect the operation of the drive. The chassis 14 is nested within an outer frame 16 in order to provide protection of the hard disk drive.

Figure 2:
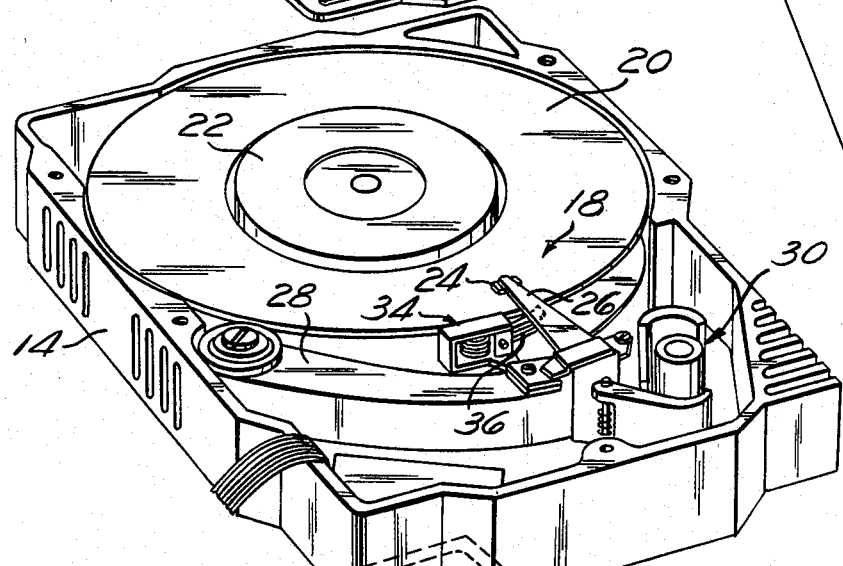
FIG. 2 is an exploded illustration of FIG. 1 illustrating the cover, an inner chassis including the head disk assembly and the head lifter of the present invention, and an outer frame.
Figure 2:
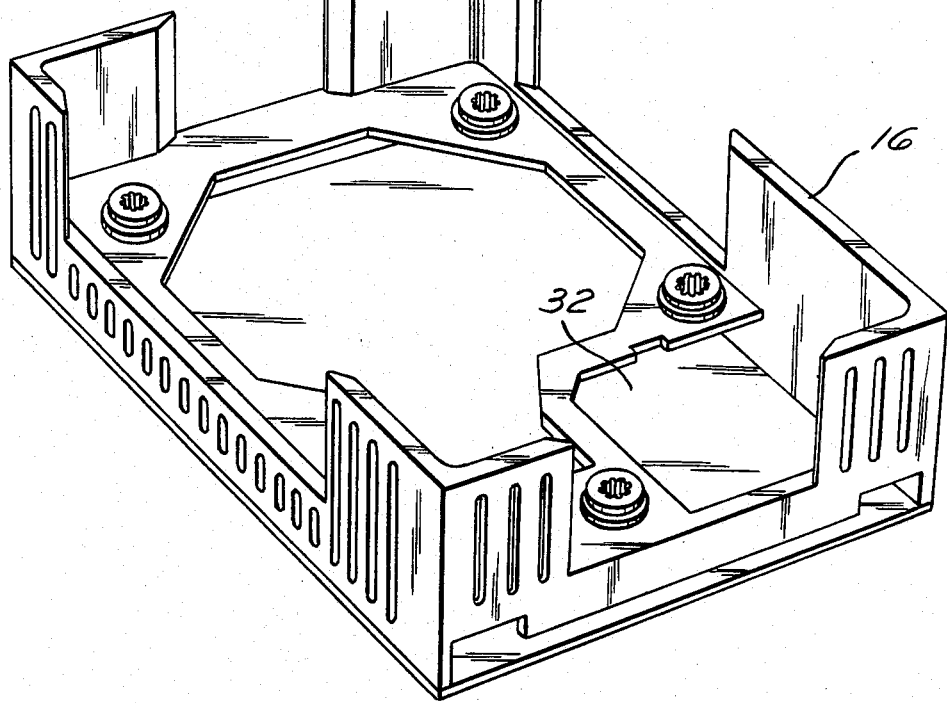

FIG. 2 is an exploded illustration of FIG. 1 exposing the head disk assembly 18 mounted within the inner chassis 14. The head disk assembly is comprised of one or more disks 20 for the recording of data, each of which is mounted for rotation on a spindle 22. The data is recorded onto the disk by means of a small flying head 24 which is attached to the end of a cantilevered flexure 26. The head/flexure assembly is mounted at the end of an actuator arm 28 whose movement is controlled by a rotary arm positioner 30 powered by a stepper motor (not shown). The stepper motor is located in the cutout portion 33 of the housing frame 16 shown in the lower right hand portion of FIG. 2.

The head lifter 34 of the present invention is shown mounted adjacent the disk 20 with its arms 36 extending beneath the flexure 26. As will be explained in more detail below, the lower flexure (not shown in FIG. 2) is also situated so that its associated head records data onto the under side of the disk shown in FIG. 2. The lower arm of the head lifter 34 automatically "lifts" the flexure away from the surface of the disk at the same time that the top flexure 26 is lifted away from the surface of the disk by the upper arm 36. For clarity and convenience of description herein, movement of the flexure away from its corresponding disk surface will be referred to as "lifting", even though motion of the lower flexure is in a downward direction. Conversely, the movement of the flexure in the direction of the disk surface in order to permit normal read/write operation will be referred to as "lowering" the flexure or head/flexure assembly.

During normal disk operation, the lifting arms 36 of the present invention are retracted so that the flexure/head assembly may perform its normal operation. However, immediately upon power off, whether intentional or unintentional, the arms of the head lifter will separate, thus lifting the flexures 26 and connected heads 24 safely from the surface of the disk 20. This lifting prevents head slap or other damage that may occur during the transportation of the computer into which the present hard disk drive is incorporated. Where the head is intended to come in contact with the disk in a designated takeoff or landing zone, the head lifter of the present invention is also constructed so as to slowly and carefully lift the head from the surface of the disk so as to avoid damage and loss of data. When power is restored to the computer and, in turn, to the disk drive, the lifting arms are once again retracted (causing them to converge or approach one another) which permits the lowering of the flexures.

FIG. 3 is an exploded view of the head lifter 34 illustrated schematically in FIG. 2, while FIG. 4 shows the lifter in greater detail in an assembled state. The head lifter is comprised of a housing 38 which also serves as a magnetic shield, a spring 40 for actuating the lifter in a power off condition, and a pair of lifters 42. The lifters 42 operate in a manner similar to the blades of a pair of scissors in lifting the head/flexure assemblies from the surface of the disk. Each lifter 42 is comprised of an armature 44 which is actuated by an electromagnetic coil 46 shown in FIG. 4, a central pivot 48, and at least one lifting arm 50 extending away from the pivot 48 in the opposite direction as the armature 44. In FIG. 3, each lifter 42 is shown with a pair of arms 50 and 51 in order to accomplish the lifting of a pair of flexures in a dual disk configuration. For example, arms 50a and 50b would lift the flexures of one disk while arms 51a and 51b would lift the flexures of a second disk. However, the principles of the present invention apply equally to a single disk or a multi-disk configuration.

The pivot members 48 are mounted on the housing 38 by means of an axis pin 52 and are spaced from the vertical wall of the housing by a spacer 54. The spring 40 also extends around the spacer 54 and is provided with a pair of tangs 56 which are inserted into small openings 58 on tabs 60 extending out from the armatures 44. As will be explained in greater detail below, the spring 40 provides the force, in a power off condition, which causes the lifting arms 50a and 50b to separate, thus removing the flexures from the disk surface.

The present invention is provided with magnetic shielding characteristics in order to preserve the integrity of the data recorded on the disk drive. The housing 38 is advantageously constructed from a magnetic metal having low magnetic retentivity. Thus, the housing serves as a shunt for the magnetic flux and conducts it away from the disk. The housing shorts the spreading of the flux and prevents from reaching the magnetically recorded data on the disk. Different types of sheet metal can be utilized for the construction of the housing such as sendust or Mu metal. The housing 38 shields the electromagnet from the disk on several sides by means of a vertical wall 62 directly adjacent the disk, a roof 64, a back wall 66 and a bottom plate 68. The bottom plate 68 includes an opening 70 for mounting the lifter on the chassis 14 of the hard disk drive by means of a suitable fastener (not shown).

The back wall 66 of the housing 38 is also provided with a pair of stops 72 for limiting the vertical displacement of the tabs 60 on the armatures 44. This prevents the arms from lifting the flexure too high and avoiding contact with the cover plate 12 of the hard disk drive.

The lifting arms 50 are constructed from a nonmagnetic metal in order to prevent the spread of flux into these portions which actually extend beyond the protective shielding of the housing 38. Thus, a well defined flux loop is generated between the armatures 44 and the pivot members 48 which also improves the magnetic shielding of the present invention. The lifting arms 50 are also angled slightly in the direction of the disk as they extend beyond the housing 38 so that the lifter itself can be removed as far as possible from the disk and still effectively accomplish its lifting purposes. In addition, the electromagnet is constructed so that it operates well below the saturation level of the magnetic members. In other words, the armature 44 is constructed so as to have a low mass, and a low current is provided so that the magnetic level is well below saturation. Furthermore, the lifting arms 50 and axis pin 52 are preferably constructed from stainless steel having very little permeability or retentivity. The armature 44 and pivot 48, on the other hand, are preferably constructed from a high magnetic material such as iron or hot or cold steel. Thus, the lifters 42 are of a two part construction in order to provide this magnetic shielding effect.

The spacer 54 also enhances the shielding effect of the present lifter by separating the coil 46 (FIG. 4) and the armatures 44 from the housing 38, thus forming an air gap. This air gap impedes the spreading of the flux generated in the electromagnet and further protects the integrity of the data recorded on the disk. The pin 52 is also constructed from a nonmagnetic metal and is preferably nickel coated in order to reduce friction and rust.

It should also be pointed out that the pin 52 about which the pivots 48 of the lifters 42 rotate also acts as a fulcrum for the action of the lever-like lifters 42. In other words, as the armatures 44 are actuated by the electromagnet, this movement is translated about the pin 52 and communicated to the lifting arms 50. A very small force generated by the electromagnet produces a larger moment at the distal end of the lifting arm 50 because of the distance or length provided by the lifter 42. This is an important feature since, as will be explained below, a significant amount of lifting force must be generated to securely retain the flexures 26 above the surface of the disk, particularly in view of the variety of locations that the arms 50 may have with respect to the length of the flexure 26 and the varying degree of force necessary at such varying positions.

For example, the natural spring force built into a flexure 26 which forces the head 24 downward against the surface of the disk may be only 10–20 grams at the distal end 74 of the flexure 26. However, because of the triangular shape of the flexure and the proximity of the flexure spring, (not shown), this spring force is much greater near the proximal end 76 of the flexure, being on the order of 40 grams. Furthermore, because the head 24 may be in any radial position along the surface of the disk when the power goes off, the lifting arms 50 must be capable of removing the flexure 26 and maintaining it spaced away from the disk in order to protect the head and the disk medium.

For example, with the head 24 in a fully retracted position, so that it is near the outer circumference of the disk, (as shown in FIG. 2) the arms 50 will contact the flexure 26 near the distal end 74 of the flexure adjacent the head. Because the flexure does not move in a true radial direction, but rather forms a slight arc as it moves the head inward and outward along the surface of the disk, the lifting arms 50 will contact the flexure at a different location, near the proximal end 76, when the head is fully extended near the spindle 22 of the disk (as shown in FIG. 4).

Thus, the lifting arms 50 are advantageously provided with a thickened distal tip 78 in order to provide additional rigidity and retentivity to the flexure 26. This thickened tip 78 is somewhat triangularly shaped and provides additional material for withstanding the greater spring force of the flexure 28 near its proximal end 76. As merely one example, the shape of the tip 78 of the lifting arm 50 may be approximately 0.65 inches in length and 0.1 inches in width. The tip 78 also is preferably slanted upward in the direction of the front 80 of the head 24 so as to ensure that the front 80 of the head is lifted upward. Thus, in loading the head in its flying position with respect to the disk, the air bearing will be easily generated in order to protect the head. In a typical embodiment, the lifter 34 is able to provide approximately a 200 gram lifting force at the strongest point of the lifting arms 50. Furthermore, the lifting arms 50 are provided with strengthening ribs 82, formed by an L-shaped cross-section, which also improve their rigidity and lifting ability. The distal end of the lifting arms 50 is provided with these thickened members because this is the portion of the lifting arms which contacts the proximal end 76 of the flexure 26 due to the curved path the flexure travels.

These features are also illustrated in FIG. 4 which shows the assembled lifter 34 adjacent a single flexure 26. The position of the flexure 26 shown in FIG. 4 corresponds to the head in roughly a fully extended position toward the center of the disk, so that the lifting arm 50 contacts the flexure near its proximal end 76. In this illustration, only one flexure is shown for clarity. As merely one example, the lifting arms 50 lift the flexures approximately 0.020–0.040 inches off the disk without causing them to contact the cover plate 12 of the disk drive. The electromagnetic operation of the present lifter and the few moving parts that it comprises enhances the reliability of the lifter 34.

FIGS. 4 and 5 illustrate in greater detail the operation of the head lifter 34 of the present invention. In FIG. 4, the roof 64 and back wall 66 of the housing 38 are broken away to reveal the armatures 44 positioned within the electromagnetic coil 46, also shown in partial section. In addition, FIG. 5 illustrates the positioning of two pair of lifting arms 50 and 51 adjacent the corresponding two pair of flexures 26 and 27 in a dual disk configuration. These figures illustrate the lifter 34 in a power off condition in which no current is provided to the coil 46 of the electromagnet. In this condition the spring 40 causes the tabs 60 on the armatures 44 to separate from one another, at the same time causing the opposite lifting arms 50 and 51 to also move to an extreme upper or lower position, thereby contacting the flexures 26 and 27 and lifting them from the surface of the disk. The spring 40 advantageously accomplishes this lifting action without the use of power so that its reliability is ensured when no power is provided to the computer or the lifter 34. The spring 40 also has a flat force/deflection curve so that it provides essentially a constant amount of separating force regardless of its initial deflection upon the assembly. Thus, the spring 40 is very forgiving both in its manufacturing stages and assembly. It is inexpensive and highly produceable. However, because of the shape and construction of the lifting arms 50, the necessary lifting force, which must be generated by the spring 40, is reduced, further ensuring the reliability of the present head lifter.

When power is once again supplied to the computer and the lifter 34, a certain level of current will be supplied to the coil 46 of the electromagnet. It is preferable that this current level be minimized as much as possible because the power supply for the computer may be a battery. Thus, preservation of power is imperative. The present lifter is constructed so as to minimize the amount of current necessary for its operation. When current is supplied to the coil 46, the armatures 44 act as plungers within the electromagnet and attract one another. This motion is in the opposite direction of that provided by the spring 40 and is strong enough to overcome the spring force. Thus, the lifting arms 50 and 51 also move toward one another thereby permitting the free motion of the flexures 26 and 27 for normal operation of the disk drive.

As will be apparent from FIGS. 3–5, as the armatures approach one another, the upper armature 44 moves downward causing lifting arms 50b and 51b to move upward. This permits the flexures 26b and 27b to clear the arms 50b and 51b and perform their normal function in a power on condition. The lower armature, on the other hand, moves upward, causing arms 50a and 51a to move downward, thus breaking contact with flexures 26a and 27a. Of course, when power is lost, the electromagnet loses its charge, eliminating the force of attraction between the armatures 44. The spring 40 then causes the armatures to separate, producing the lifting motion in the arms 50 and 51 which is opposite to that just described.

The armatures 44 of the lifter of the present invention are shaped so as to decrease the amount of current, which is also referred to as the "pick" current, necessary to accomplish their attraction. It is well known that magnetic flux does not easily bridge an air gap. Accordingly, one armature of the lifter is provided with a tab 84 (FIGS. 5 and 6) which is closely situated adjacent the opposite armature, thus greatly reducing the amount of air gap separating the two armature members 44. In this configuration, a decreased picking current, on the order of 1–1.2 amps, is all that is necessary in order to cause the two armatures to attract one another. Once the picking has been accomplished, a very low holding current is all that is necessary to maintain the armatures in their attracted position, such a holding current being on the order of less than a 100 mW equivalent. Thus, an important advantage of the present invention is that the amount of picking and holding current is greatly reduced. Furthermore, this low current requirement is enhanced by the well defined flux loop described above.

FIG. 6 illustrates the dampening aspects of the present electromagnet. In order to avoid damage to the flexure and head, it is important that the lifting arms slowly and controllably lift and lower the flexures. Accordingly, the tabs 60 extending from the armatures 44 are provided by pistons 86 which are mounted on a air cylinder 88, which in turn acts as a bellows for the dampener. The cylinder is 88 preferably constructed from a flexible material such as rubber or neoprene and is provided with an opening 90 through one of the cylinder members. Thus, as the armatures 44 move toward and away from one another during the operation of the lifter, the air within the cylinder 81 acts as a dampener to slow and control the motion of the armatures 44 and, in turn, the motion of the lifting arms. As the pistons 86 approach one another during the lowering of the flexures, air is adiabatically compressed in the cylinder 88 to slow the motion of the arms. As the pistons 86 separate during the lifting of the flexures, a vacuum tends to exist, counteracting the motion of the pistons 86. By means of this dampener, the lifting and lowering of the heads is accomplished at a very low speed.

Alternatively, the positioning of the pistons with respect to this air cylinder can be reversed. It has been found that the picking motion of the armatures is more difficult to control because it generates rapid acceleration. This uncontrolled motion in turn generates undesirable motion in the lifting arms. It has also been found that the vacuum stroke of the air cylinder provides better control for combating this accelerated motion during picking. Thus, FIG. 7 illustrates a reverse orientation of the pistons 92 on the air cylinder 88 which permits the cylinder to pull against the vacuum during the picking motion.

FIG. 8 is an exploded schematic view illustrating an alternate embodiment of the head lifter of the present invention in which the flexibility of the spring 40 is also utilized to provide a dampening effect for controlling the motion of the lifting arms 94. In this embodiment, only a single disk configuration is shown, although the principles are equally applicable to a multidisk arrangement. In this embodiment, each lifting arm 94 rotates about the pin 52 as before but does not terminate in the armature. Rather, the arm 94 extends completely back to the tab 96 which is attached to the air cylinder damper 88 illustrated in FIGS. 5, 6 and 7. The spring 40 is placed around the pin 52 as before but is attached by means of tangs 56 to the tabs 96 of the lifting arms 94. The armatures 98 located within the electromagnetic coil 46 are rigidly attached to the spring 40 in approximately midway between the pin and the tab. Thus, during picking, the armature members 98 will attract one another and converge as before. However, rather than acting directly upon the lifting arms 94, the attraction of the armatures applies a force directly on the spring 40. Because of the flexibility of the spring, it bends slightly, as shown in dotted lines FIG. 8, before imparting this motion to the tabs 96 of the lifting arms 94. Eventually, the motion is imparted to the lifting arms, but in a dampened, controlled fashion. In other words, the rapid acceleration of the armature is not imparted directly to the lifting arm, but is dampened by means of the bending of the spring as well as the air cylinder 88, as described above. In this embodiment, all four components, a pair of lifting arms 94 and a pair armatures 98, pivot about the pin 52.

In conclusion, the present head lifting mechanism provides safe and reliable operation for Winchester type hard disk drives.

What is claimed is:

1. A head lifter for a disk drive which records digital data from a computer onto a disk, the disk drive comprising a pair of magnetic heads for recording digital information on the disk, a first flexure for supporting one of the heads, and a second flexure for supporting the other of the heads, said head lifter protecting the heads and disk from damage during shipping or transportation of the drive or from accidental loss of power, said head lifter comprising:
   a fulcrum;
   a first arm having two ends and pivotally connected to said fulcrum for making contact with the first flexure, said first arm being connected to said fulcrum at a pivot point intermediate the ends of said first arm;
   a second arm having two ends and pivotally connected to said fulcrum for making contact with the second flexure, said second arm being connected to said fulcrum at said pivot point; and
   an electromagnet with a first armature connected to said first arm and a second armature connected to said second arm for causing said arms to pivot about said fulcrum to allow the first and second flexures to load the magnetic heads onto the disk.

2. The head lifter of claim 1 additionally comprising a sear spring having one of its ends connected to said first arm and its other end connected to said second arm whereby said sear spring exerts a spreading force on said arms which opposes the force exerted by said electromagnet whereby said arms are caused to contact the first and second flexures so that the magnetic heads are lifted from the disk.

3. The head lifter of claim 2 wherein said sear spring has a flat force/deflection curve in order to provide a substantially constant separating force to said arms regardless of the amount of deflection of said spring.

4. The head lifter of claim 2, wherein one of said arms has a thickened distal tip to increase the lifting force generated by said arm.

5. The head lifter of claim 1 wherein each of said arms comprises a pivot member of a highly magnetic material connected to a lifting member of a nonmagnetic material in order to provide a closed flux loop when said electromagnet is energized.

6. The head lifter of claim 1 further comprising means for magnetically shielding the flux generated in said electromagnet from the disk.

7. The head lifter of claim 6 wherein said armatures are separated by an air gap when said electromagnet is not activated, further comprising a tab for reducing said air gap between said armatures in order to decrease the amount of picking current required by aid electromagnet.

8. The head lifter of claim 6 additionally comprising means for limiting the displacement of said arms.

9. The head lifter of claim 8 additionally comprising air compression and vacuum means for controlling the acceleration of said arms, said air compression and vacuum means dampening the acceleration caused by the picking of said armatures.

10. The head lifter of claim 9 wherein said air compression means pulls against a vacuum diving picking.

11. A head lifter for a disk drive which records digital data from a computer onto a disk, the disk drive comprising a pair of magnetic heads for recording digital information on the disk, a first member for supporting one of the heads, and a second member for supporting the other of the heads, said head lifter protecting the heads and disk from damage during shipping or transportation of the drive or from accidental loss of power, said head lifter comprising:
  a fulcrum;
  a first arm pivotally connected to said fulcrum for making contact with the first member, said first arm being connected to said fulcrum at a pivot point intermediate the ends of said first arm;
  a second arm pivotally connected to said fulcrum for making contact with the second member, said second arm being connected to said fulcrum at said pivot point;
  a sear spring with two elongate portions having one of its ends connected to said first arm and its other end connected to said second arm whereby said sear spring exerts a spreading force on said arms causing said arms to contact the first and second members so that the magnetic heads are lifted from the disk; and
  an electromagnet with a first armature connected to one of said elongate portions of said sear spring and a second armature connected to the other of said elongate portions, each armature being connected to each elongate portion at a point whereby the acceleration of said arms caused by the energization of said electromagnet is damped as a result of the flexiblility of said portions of said spring.

12. The head lifter of claim 9 wherein said sear spring has a flat force/deflection curve in order to provide a substantially constant separating force to said arms regardless of the amount of deflection of said spring, wherein one of said arms has a thickened distal tip to increase the lifting force generated by said arm, and wherein said armatures are separated by an air gap when said electromagnet is not activated, additionally comprising:
  means for magnetically shielding the flux generated in said electromagnet from the disk;
  means for reducing said air gap between said armatures in order to decrease the amount of picking current required by said electromagnet; and
  means for limiting the displacement of said arms.

* * * * *

UNITED STATES PATENT AND TRADEMARK OFFICE
CERTIFICATE OF CORRECTION

PATENT NO. : 4,661,873
DATED     : April 28, 1987
INVENTOR(S) : Dieter M. Schulze It is certified that error appears in the above-identified patent and that said Letters Patent is hereby corrected as shown below:

Column 1, line 27, "files" should be --"flies"--.

Column 2, line 64, "ot" should be --of--.

Column 3, line 18, "torced" should be --forced--.

Column 11, line 3, "aid" should be --said--.

Column 11, line 13, "diving" should be --during--.

Column 12, line 16, "9" should be --11--.

Signed and Sealed this

Twenty-fifth Day of August, 1987

*Attest:*

DONALD J. QUIGG

*Attesting Officer*   *Commissioner of Patents and Trademarks*